US008154836B2

(12) United States Patent
Kasztenny et al.

(10) Patent No.: US 8,154,836 B2
(45) Date of Patent: Apr. 10, 2012

(54) LINE CURRENT DIFFERENTIAL PROTECTION UPON LOSS OF AN EXTERNAL TIME REFERENCE

(75) Inventors: Bogdan Z. Kasztenny, Markham (CA); Normann Fischer, Colfax, WA (US); Luther S. Anderson, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 317 days.

(21) Appl. No.: 12/561,979

(22) Filed: Sep. 17, 2009

(65) Prior Publication Data

US 2011/0063766 A1  Mar. 17, 2011

(51) Int. Cl.
*H02H 3/00* (2006.01)
(52) U.S. Cl. ............................................ 361/62; 361/69
(58) Field of Classification Search ................ 361/62–69
See application file for complete search history.

(56) References Cited

U.S. PATENT DOCUMENTS

| | | | |
|---|---|---|---|
| 3,781,706 A | 12/1973 | Osborne | |
| 5,367,426 A | 11/1994 | Schweitzer, III | |
| 5,671,112 A | 9/1997 | Hu | |
| 5,805,395 A | 9/1998 | Hu | |
| 5,943,381 A | 8/1999 | Zampetti | |
| 6,115,825 A | 9/2000 | Laforge | |
| 6,256,592 B1 | 7/2001 | Roberts | |
| 6,356,127 B1 | 3/2002 | Klipper | |
| 6,356,421 B1 | 3/2002 | Guzman-Casillas | |
| 6,456,947 B1 | 9/2002 | Adamiak | |
| 6,518,767 B1 | 2/2003 | Roberts | |
| 6,590,397 B2 | 7/2003 | Roberts | |
| 6,879,917 B2 | 4/2005 | Turner | |
| 7,272,201 B2 | 9/2007 | Whitehead | |
| 7,345,863 B2 | 3/2008 | Fischer | |
| 7,398,411 B2 | 7/2008 | Zweigle | |
| 7,425,778 B2 | 9/2008 | Labuschagne | |
| 7,472,026 B2 | 12/2008 | Premerlani | |
| 7,480,580 B2 | 1/2009 | Zweigle | |
| 7,502,696 B2 * | 3/2009 | Moxley ........................... 702/60 |
| 7,630,863 B2 | 12/2009 | Zweigle | |

(Continued)

OTHER PUBLICATIONS

Debra Carroll and John Dorfner, Tacoma Power, Tony Lee and Ken Fodero, Schweitzer Engineering Laboratories, Inc., Chris Huntley, GE Lentronics, Resolving Digital Line Current Differential Relay Security and Dependability Problems: A Case History 29th Annual Western Protective Relay Conference, Spokane Washington, Oct. 22-24, 2002.

Gabriel Benmouyal, Joe B. Mooney, Schweitzer Engineering Laboratories, Inc., Advanced Sequence Elements for Line Current Differential Protection, 2006.

(Continued)

*Primary Examiner* — Danny Nguyen
(74) *Attorney, Agent, or Firm* — Stoel Rives, LLP

(57) ABSTRACT

A line current differential protection system that uses an external time reference continues providing protection to a power apparatus upon the loss of the external time reference. An external time reference synchronization mode and a channel based synchronization mode may be selectively applied on a per channel basis such that only those channels in the system that are not guaranteed to stay symmetrical use external time reference synchronization. When the external time reference is lost, fallback strategies may be used such as disabling or de-sensitizing the line current differential protection function, switching from the external time reference synchronization mode to a channel based synchronization mode with appropriately selected protection settings, and/or marking the channel as unavailable to isolate the system from the consequences of synchronization errors over this channel and instead using a master-slave mode with other available channels to continue providing line protection with the current differential system.

20 Claims, 8 Drawing Sheets

U.S. PATENT DOCUMENTS

| | | |
|---|---|---|
| 7,899,619 B2 | 3/2011 | Petras |
| 2001/0023464 A1 | 9/2001 | Deck |
| 2004/0080884 A1* | 4/2004 | Roberts et al. ............... 361/62 |
| 2005/0069025 A1 | 3/2005 | Kimura |
| 2007/0030841 A1 | 2/2007 | Lee |
| 2007/0070565 A1 | 3/2007 | Benmouyal |
| 2008/0071482 A1 | 3/2008 | Zweigle |
| 2008/0097694 A1 | 4/2008 | Petras |
| 2009/0088990 A1 | 4/2009 | Schweitzer |
| 2009/0091867 A1 | 4/2009 | Guzman-Casillas |
| 2011/0135047 A1 | 6/2011 | Tournier |

OTHER PUBLICATIONS

Demetrios A. Tziouvaras, Jeff Roberts, and Gabriel Benmouyal, Schweitzer Engineering Laboratories, Inc., New Multi-Ended Fault Location Design for Two- or Three-Terminal Lines, Nov. 1, 2004.

Gabriel Benmouyal, Schweitzer Engineering Laboratories, Inc., The Trajectories of Line Current Differential Faults in the Alpha Plane, Sep. 22, 2005.

GE Industrial Systems L90 Line Current Differential System, UR Series Instruction Manual, Section 8, Manual P/N:1601-0081-T1(GEK-113488) L90 revision: 5.6x 2008, Section 8.

* cited by examiner

LINE CURRENT DIFFERENTIAL PROTECTION UPON LOSS OF AN EXTERNAL TIME REFERENCE

CROSS-REFERENCES TO RELATED APPLICATIONS (Not Applicable)

BACKGROUND OF THE INVENTION

1. Field of the Invention

This disclosure relates to differential protection systems. More particularly, this disclosure includes systems and methods for providing line current differential protection utilizing an external time reference when the external time reference is temporarily unavailable.

2. Description of the Related Art

Line current differential protection systems generally rely on proper handling and synchronization of data communicated between terminals of a power apparatus. A line current differential function responds to a sum of currents within a zone of protection. Thus, line current differential protection systems use current values that may be measured at different line terminals synchronized to a common reference base. Data synchronization may include, for example, channel based synchronization or external time reference based synchronization.

BRIEF SUMMARY

In one embodiment, the present disclosure relates to a system to provide line current differential protection to a power apparatus that includes three or more terminals upon the loss of an external time reference, the system comprising three or more relays to determine current values at respective terminals of a power apparatus, each relay configured to communicate its current values through respective communication channels to at least one of the other relays, the three or more relays configured, based on characteristics of the respective communication channels, to operate at least a first communication channel in a channel based synchronization mode and at least a second communication channel in an external time reference synchronization mode, wherein upon the loss of an external time reference, a first relay and a second relay configured to communicate with each other through the second communication channel apply a fallback strategy to provide line current differential protection to the power apparatus in the absence or inaccuracy of the external time reference.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION OF PREFERRED EMBODIMENTS

Overview

Figure 1:
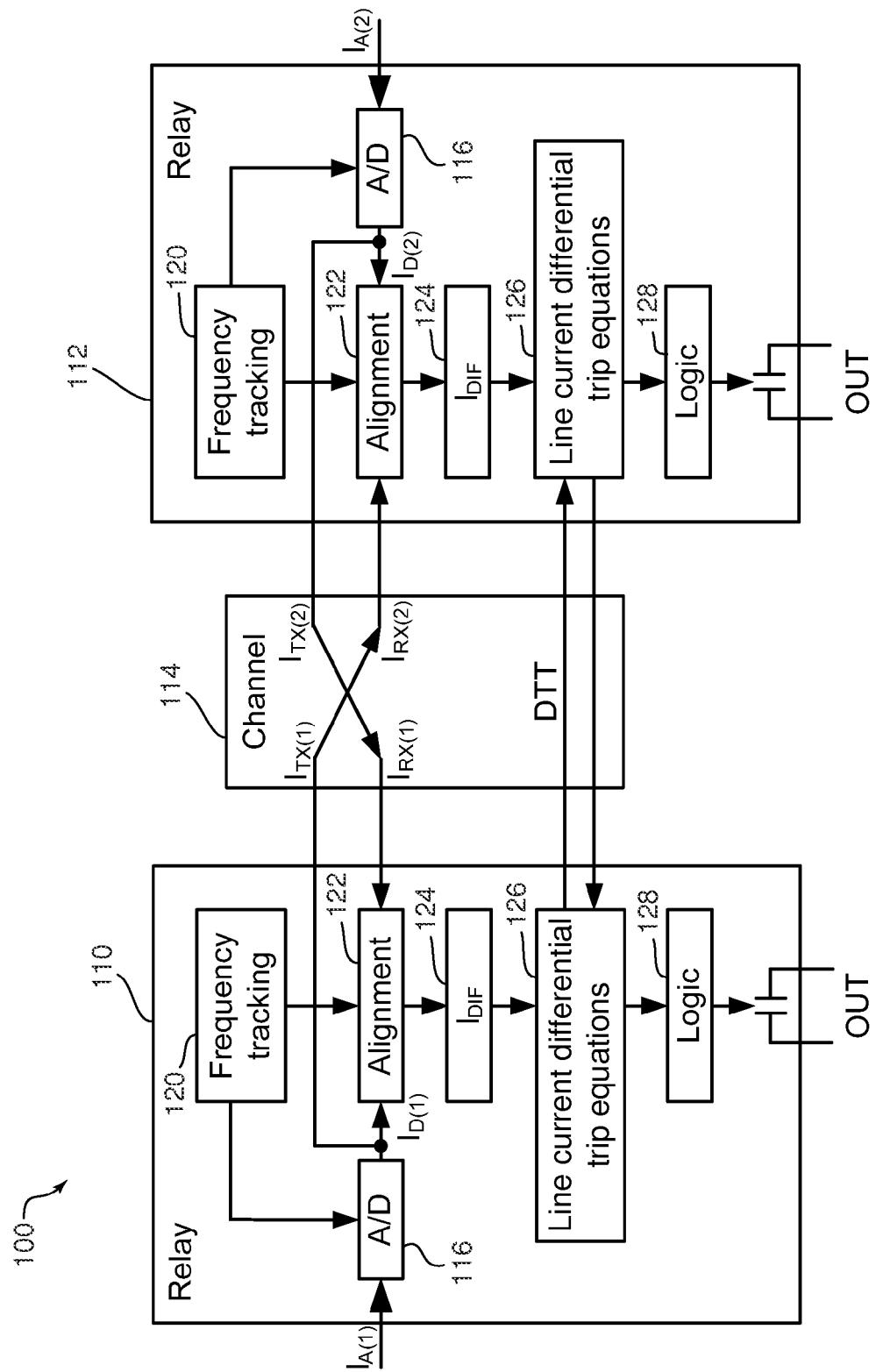
FIG. 1 is a block diagram illustrating a simplified version of a line current differential protection system.

As discussed below, channel based synchronization works with symmetrical channels (e.g., a communication channel wherein channel delay is substantially the same in both the transmit and receive directions) and uses a "ping-pong" technique to calculate a channel delay time. The channel delay time is then used to align the current values, or to control clocks at the respective terminals to null out the time difference between the current values.

External time reference based synchronization uses a common time source, such as a satellite clock via a time code input (e.g., IRIG-B specified by the inter-range instrumentation group time codes), to correlate the data at each terminal to the same common reference, and by doing so align the data between different terminals of the line current differential system. This method makes the line current differential protection system dependent on the external time source, but is used for applications with asymmetrical channels or channels with non-deterministic delivery times.

Certain embodiments disclosed herein allow a line current differential protection system to continue providing protection to a power apparatus upon the loss of an external time reference. The loss of the external time reference may include an absence of the external time reference, or the loss may be a degradation or inaccuracy of the external time reference that limits its usefulness for external time reference based synchronization. In certain embodiments, the external time reference based synchronization and the channel based synchronization methods are selectively applied on a per channel basis within the protection system. In such embodiments, only those channels in the system that are not guaranteed to stay symmetrical use external time reference synchronization. As a whole, this limits the exposure of the line current differential protection system to problems associated with the timing sources becoming unavailable. Mixing the two synchronization methods within one protection system is achieved according to one embodiment by using the respective terminal clocks in both methods, depending on the particular communication channels used. In the channel based synchronization method suitable for symmetrical channels, a clock offset is calculated via a ping-pong process. In the external time reference based synchronization method suitable for asymmetrical channels, a clock offset automatically becomes zero because both clocks at the ends of the channel are synchronized to the same time reference.

When a channel is operating in an external time reference synchronization mode, the line current differential protection function may continue to operate for a certain period of time after the external time reference is lost. It may take some time for the internal clocks of the respective terminals to drift away from one another to the point where the line current differential protection function produces errors. The system, for example, may continue to be sufficiently synchronized for at least a few seconds. Thus, according to one embodiment, the clock offset is still assumed to be zero during a predetermined period of time. If the external time reference is not reacquired during the predetermined period of time, then the system implements one or more fallback strategies. The fallback strategies may include, for example, disabling or de-sensitizing (e.g., to a user selected degree) the line current differential protection function. As discussed in detail below, other fallback strategies include switching from the external time reference synchronization mode to a channel based synchronization mode, or marking the channel as unavailable and using other available channels in a master-slave mode to provide communication for the line current differential protection.

If a channel is symmetrical just prior to losing the external time reference (e.g., within a predetermined period of time before losing the external time reference), according to one embodiment, the fallback strategy may include switching the channel from the external time reference synchronization mode to the channel based synchronization mode until the time reference is reacquired, until a predetermined period of time lapses, or until a predetermined event occurs. The predetermined event may include a determination that the channel is no longer symmetrical or that it may soon become asymmetrical. For example, in one embodiment the system monitors changes to a total (roundtrip) channel time. A change to the total channel time that exceeds a predetermined threshold indicates that the channel has been switched and may become asymmetrical as a result of the switching. Thus, the system responds to the change in the total channel time by implementing a different fallback strategy.

If a channel displays a stable limited asymmetry prior to losing the external time reference, according to one embodiment, the fallback strategy may include calculating a possible spurious differential current corresponding to the asymmetry and determining appropriate protection countermeasures (e.g., a stability angle setting used in an alpha plane analysis, or a slope setting of the characteristic in a percentage restraint characteristic analysis). Upon losing the external time reference, the system switches the channel from the external time reference synchronization mode to the channel based synchronization mode and applies the determined protection countermeasures to counter the possible spurious differential current. As discussed above, the system may continue applying the determined protection countermeasures to the channel in the channel based synchronization mode until the time reference is reacquired, until a predetermined period of time lapses, or until a predetermined event occurs (e.g., a change in the total channel time indicating channel switching).

In certain embodiments, the system applies protection countermeasures based on a worst case channel asymmetry value. For example, during the external time reference synchronization mode, the system periodically measures the channel's transmit time and receive time. The difference between the two times corresponds to a channel asymmetry value. The system stores a worst case channel asymmetry value (e.g., the largest difference between the transmit and receive time values) during the channel's lifetime. The channel's lifetime may begin, for example, when one or more relays are first configured to communicate through the channel in the protection system. Initially, a user setting may be used as the worst case asymmetry value. With passing of time (e.g., weeks, months, and years), a measured worst case asymmetry value is established for a given channel.

As discussed above, the system converts the worst case asymmetry into protection settings that provide a level of security, if the channel based synchronization were to be used for the channel. For example, if the external time source is lost, the system switches from the external time reference synchronization mode to the channel based synchronization mode and applies the pre-calculated settings. If the channel is or becomes asymmetrical, the data communicated through the channel may not be well synchronized, but the protection settings that are set for the worst case asymmetry continue providing security with minimum possible erosion in dependability.

In certain embodiments where both symmetrical and asymmetrical channels are used within the same multi-terminal line current differential protection system, the protection system may designate an asymmetrical channel as unavailable if an external time reference was lost at either end of the channel. With enough remaining connections between the relays, a master-slave operation may be used that maintains the functionality of the line current differential protection system with a drawback of a slightly delayed tripping at the slave sites.

For illustrative purposes, the example embodiments disclosed herein provide protection for power transmission lines. As used herein, a "power apparatus" is a broad term that includes its normal and customary meaning and may include, for example, a power transmission line, a power bus, a large motor, a generator, a transformer, a combination of the foregoing, or any other device or devices that may be removed from a power system (e.g., using breakers and/or relays) when a fault is detected. A power system, for example, may be divided into zones of protection to allow for the removal of a minimal amount of equipment from the power system during a fault condition. Each zone may be associated with its own protection system such that a fault within a particular zone causes the corresponding protection system to operate, whereas a fault in another zone will not cause the protection system to operate. The zone boundaries may be defined by the location of measuring points (e.g., current transformers (CTs)) and circuit breakers that operate to isolate the zone.

An alpha plane protection system is disclosed in U.S. Pat. No. 6,518,767, titled "Line Differential Protection System for a Power Transmission Line," which is assigned to the assignee of the present disclosure, and which is hereby incorporated herein for all purposes. The alpha plane current differential protection principle (or alpha plane principle) disclosed in U.S. Pat. No. 6,518,767 provides a line differential protection system that, while still dependent upon a communication channel, includes significant improvements relative to other system considerations, including high fault resistance coverage and improved operating characteristics and sensitivity, while at the same time maintaining power system security.

The embodiments of the disclosure will be best understood by reference to the drawings, wherein like elements are designated by like numerals throughout. In the following description, numerous specific details are provided for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or detailed description is for illustrative purposes only and is not meant to imply a required order, unless specified to require an order.

Embodiments may include various steps, which may be embodied in machine-executable instructions to be executed by a general-purpose or special-purpose processor or computer (or other electronic device). Alternatively, the steps may be performed by hardware components that include specific logic for performing the steps or by a combination of hardware, software, and/or firmware.

Embodiments may also be provided as a computer program product including a machine-readable medium having stored thereon instructions that may be used to program a computer (or other electronic device) to perform the processes described herein. The machine-readable medium may include, but is not limited to, hard drives, floppy diskettes, optical disks, CD ROMs, DVD ROMs, ROMs, RAMs, EPROMs, EEPROMs, magnetic or optical cards, solid-state memory devices, or other types of media/computer-readable medium suitable for storing electronic instructions.

Data Handling in a Line Current Differential System

FIG. 1 is a block diagram illustrating a line current differential protection system 100 that provides line current differential protection. The system 100 includes a first relay 110 and a second relay 112 that communicate with each other through a communication channel 114. An artisan will recognize from the disclosure herein that the system 100 may include additional relays (not shown) located at various terminals of a multi-terminal power apparatus (not shown).

The relays 110, 112 in the system 100 depend on each other to serve their purpose of providing line current differential protection, but may be located at different substations and operate autonomously in terms of sampling, frequency tracking, transmission and reception of data, filtering, and protection calculations. Each relay 110, 112 includes an analog-to-digital (A/D) converter 116, a frequency tracking module 120, an alignment module 122, a differential current ($I_{DIF}$) module 124, a line current differential trip equations module 126, and logic 128 for tripping the power apparatus.

Each relay 110, 112 samples its respective input currents $I_{A(1)}$, $I_{A(2)}$ (e.g., received from respective CTs (not shown)) via the A/D converter 116 to obtain a digital representation $I_{D(1)}$, $I_{D(2)}$ of the analog inputs $I_{A(1)}$, $I_{A(2)}$. The sampling rate may vary, for example, from few kilohertz to less than 20 samples per cycle depending on the particular application. The same digital data $I_{D(1)}$, $I_{D(2)}$ is provided to the line current differential subsystem (the alignment module 122, the $I_{DIF}$ module 124, the line current differential trip equations module 126, and the logic 128), and may also be provided to local functions such as metering, fault recording, and protection (e.g., distance backup, breaker failure, overcurrent, and so on). Therefore, the sampling is typically of high resolution and rate, even though the line current differential subsystem may utilize this data at lower sampling rates.

The frequency tracking module 120 tracks the frequency of the power apparatus. The frequency tracking module 120 cooperates with the A/D converter 116 such that the sampling may be performed at a variable rate that tracks the power apparatus frequency. The samples may be taken asynchronously or synchronously with the universal time to ease implementation of synchrophasor measurements. Some embodiments allow the relays 110, 112 to sample asynchronously from each other while other embodiments use the communication channel 114 to force synchronization of relay sampling clocks (not shown).

The $I_{DIF}$ module 124 generates a differential current $I_{DIF}$ as a sum of local and remote current data. The line current differential trip equations module 126 uses the differential current $I_{DIF}$ to determine when to trip power apparatus. This determination may be based, for example, on a percentage differential analysis or on an alpha plane analysis.

To facilitate the operation of the line current differential trip equations module 126, local current data is communicated to remote terminals. For example, the first relay 110 communicates its current $I_{D(1)}$ through the communication channel 114 as transmitted current data $I_{TX(1)}$. The second relay 112 receives, as a received current $I_{RX(2)}$, the transmitted current data $I_{TX(1)}$ from the first relay 110. The second relay 112 provides the received current $I_{RX(2)}$ to its alignment module 122. Similarly, the second relay 112 communicates its current $I_{D(2)}$ through the communication channel 114 as transmitted current data $I_{TX(2)}$. The first relay 110 receives, as a received current $I_{RX(1)}$, the transmitted current data $I_{TX(2)}$ from the second relay 112. The first relay 110 provides the received current $I_{RX(1)}$ to its alignment module 122. Thus, each relay 110, 112 receives a full set of data from all its remote peers (e.g., as discussed above, data may be received from other relays), aligns the data, generates the differential current $I_{DIF}$, runs its differential trip equations, and operates autonomously in a master mode. If one of the relays 110, 112 only serves the data but does not receive all the remote data due to a permanent lack of communication (e.g., channel not installed) or a temporary loss of communication, the relay is referred to herein as working in a slave mode. A direct transfer tripping (DTT) signal from a relay operating in the master mode allows a relay operating in the slave mode to issue the trip command to its respective breakers.

The alignment modules 122 in the respective relays 110, 112 provide proper data handling and synchronization. In certain embodiments, the alignment modules 122 provide one or more of the following: unified packet structure and near-identical processing for the channel based synchronization and the external time reference based synchronization methods; minimum requirement for extra payload to communicate sequence numbers, time stamps, and other timing and data tagging information; security under and fast recovery from lost packets and channel brown-out conditions; immunity to step changes and variations in channel delay; ability to work with channels having a total round trip delay of, for example, up to 80 ms; accuracy of data alignment better than, for example, about 1.0 electrical degree; quick start up, for example, in the order of a few tens to a few hundreds of milliseconds, without the need for clock synchronization or similar mechanisms; and (in applications with an external time reference) ability to measure actual channel delays independently in the transmit and receive directions.

The alignment modules 122 according to certain embodiments provide data handling and synchronization based on estimating the clock offset and compensating the data time stamps for this offset. The sent current data $I_{TX(1)}$, $I_{TX(2)}$ are time-stamped according to the local relay time of the particular relay 110, 112 that transmitted the data. The relay times are synchronized to an external time source (e.g., GPS), if the external time source is available. Otherwise, if either of the relays 110, 112 loses access to the external time source, the relay times are unsynchronized with respect to each other, and the time difference between the relays 110, 112 may drift with respect to each other.

The alignment modules 122 determine the clock offset and augment the respective time stamps to express both the local and the remote data in the same consistent time. In the channel based synchronization mode, the alignment modules 122 measure the time offset. Because the estimated offset changes very slowly, the alignment modules 122 apply heavy averaging to the raw measurements, which allows the alignment method to ride through a temporary channel loss, corrupted packets, channel switching, and other impairments. In the external time reference mode, the clock offset is known and equals zero.

When in the channel based synchronization mode, the alignment modules 122 may measure the clock offset and use it even if the two relays 110, 112 are synchronized to an external time reference and the calculations return the clock offset of zero. The alignment method in the channel based synchronization mode does not depend on the availability or precision of the external time source, even if the external time source is connected and available, unless an explicit user setting mandates using the external time reference synchronization method.

When compared to a method that forces synchronization of the relay sampling clocks, certain embodiments disclosed herein are both simpler and more robust. By estimating a slowly changing parameter (the clock offset) the embodiments apply averaging and benefit from the resulting advantages. By not synchronizing sampling clocks, the embodiments may be naturally extended on multi-terminal applications and allow a mixed synchronization mode in which some data is synchronized based on symmetrical channels and some is synchronized externally. This limits exposure to problems with the external time reference.

The two synchronization methods (channel based synchronization and external time reference synchronization) and various fallback strategies for the loss of the external time reference are discussed in detail below.

Channel Based Synchronization

Figure 2:
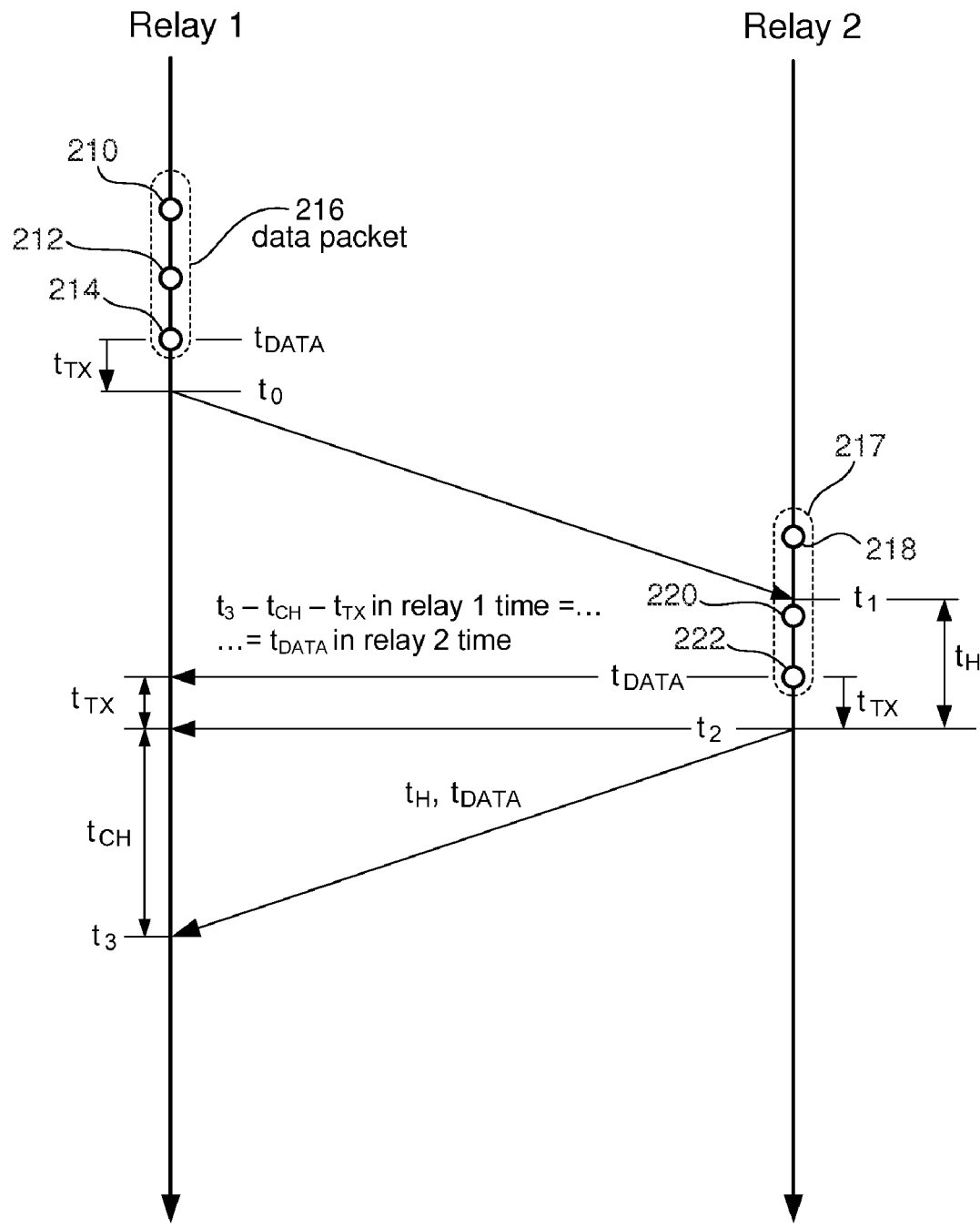
FIG. 2 illustrates an example timing chart of communication between a first relay and a second relay using channel based synchronization according to one embodiment.

FIG. 2 illustrates an example timing chart of communication between a first relay ("relay 1") and a second relay ("relay 2") using channel based synchronization according to one embodiment. As discussed above, channel based synchronization uses a ping-pong process where messages sent back and forth are used to calculate a time difference between the relays. As shown in FIG. 2, relay 1 collects some number of current samples, for example three samples 210, 212, 214 for transmission, forms a packet 216 that includes the current samples 210, 212, 214, and at time $t_0$ (corresponding to a predetermined time constant $t_{TX}$ after the newest sample 214 was taken) transmits the packet 216. The packet 216 is marked with a sequence number to identify it at the time of usage. The time $t_0$ is captured by relay 1 using its own local time. An explicit time stamping for the outgoing message may be used, or the time $t_0$ may be derived from a time stamp of the newest sample 214 in the packet 216 and the predetermined time constant $t_{TX}$.

The packet 216 arrives at relay 2 after an unknown channel delay time (e.g., a few milliseconds to tens of milliseconds). Relay 2 captures the packet's arrival time $t_1$ using its own local clock. The clock of relay 2 is asynchronous from the clock of relay 1. The time $t_1$ is used to measure the message hold time (turnaround time) at relay 2 in order to facilitate the ping-pong algorithm for estimation of the channel delay.

At some time after relay 2 receives the packet 216 from relay 1, relay 2 forms a packet 217 that includes three fresh samples 218, 220, 222 of its own currents, and relay 2 is ready to send the packet 217 to relay 1. Relay 2 transmits the packet 217 to relay 1 at time t2, (corresponding to the predetermined time constant $t_{TX}$ after the newest sample 222 was taken). A hold time $t_H = t_2 - t_1$ is included in the payload of the packet 217. The hold time $t_H$ is known in advance as the message is delayed by the predetermined time constant $t_{TX}$ from the newest sample 222 in the packet 217, and the current samples 218, 220, 222 are located at known points in time. Therefore, the hold time $t_H$ may be pre-calculated at some point after capturing the $t_1$ and may be conveniently put in the packet 217 ahead of the transmission time $t_2$. Relay 2 returns the message sequence number to let relay 1 know that the hold time $t_H$ returned to relay 1 was for the message that originated at $t_0$.

In its packet 217, relay 2 includes a time stamp $t_{DATA}$ for the current samples 218, 220, 218 (e.g., the time stamp $t_{DATA}$ may be the time stamp of the newest sample 222 in the set of three). In a practical implementation, the packet sequence number and the time stamp $t_{DATA}$ provided by relay 2 may be the same number.

Relay 1 receives the packet 217 transmitted by relay 2 after a channel delay (e.g., few milliseconds to tens of milliseconds). Relay 1 captures the time of reception as $t_3$ using its own clock. From the sequence number received, relay 1 knows this is a reply to the message sent out at time $t_0$.

At this point, relay 1 may finish the calculations related to channel delay, clock offset, and data alignment.

Assuming symmetrical channel delay, the one way channel delay time $t_{CH}$ is:

$$t_{CH} = \frac{(t_3 - t_0) - t_H}{2}. \quad (1)$$

Note that the difference between time $t_3$ and time $t_0$ is the time elapsed at the local relay, and the hold time $t_H$ is the time measured by the remote relay and communicated back explicitly. Therefore, equation (1) makes sense even though its components were derived from two asynchronously running clocks.

Backdating the time $t_3$ by the channel delay time $t_{CH}$, the transmission time $t_2$ at relay 2 expressed in the local time of relay 1 is:

$$t_{2(@relay1)} = t_3 - t_{CH} \quad (2)$$

Backdating further by the predetermined time constant $t_{TX}$ representing the delay in transmitting a packet after capturing the data, the data time $t_{DATA}$ expressed in time of relay 1 is:

$$t_{DATA(@relay1)} = t_3 - t_{CH} - t_{TX} \quad (3)$$

The data time stamp $t_{DATA}$ expressed in relay 2 time is included in the packet 217. This allows calculating an offset time $T_{OFFSET}$ (e.g., the difference in time between the two relays) as:

$$\begin{aligned} t_{OFFSET} &= t_{DATA(@relay1)} - t_{DATA} \quad (4) \\ &= \ldots \ldots \\ &= t_3 - t_{CH} - t_{TX} - t_{DATA}. \end{aligned}$$

Positive values of the offset time $t_{OFFSET}$ indicate that the local clock (relay 1) is leading the remote clock; negative offset time $t_{OFFSET}$ indicates that the remote clock is ahead. Inserting equation (1) into equation (4) gives the following equation:

$$t_{OFFSET} = \frac{1}{2} \cdot (t_0 + t_3 + t_H) - t_{TX} - t_{DATA}. \quad (5)$$

Note that the clock offset value is a very stable number as it reflects a difference between clocks of the two relays, regardless of data latency and therefore regardless of the channel delay at any given moment. The clock offset value may change at a rate of a few parts per million depending on stability of the oscillators used in the relay hardware. Therefore, values provided by equation (5) over a number of measurements are averaged. This allows riding through channel impairments and increases accuracy by allowing round up errors and jitter to average out.

The clock offset value is used to correct the remote time stamp into the local time:

$$t_{DATA(@relay1)} = t_{DATA} + t_{OFFSET} \quad (6)$$

where $t_{OFFSET}$ is the estimate of the clock differences maintained via repeated measurements and averaging, and $t_{DATA}$ is a time stamp received with the data to be aligned each time a packet is received.

Numerical Example for Channel Based Synchronization

The following numerical values for channel based synchronization are provided by way of example only, and not by limitation. With reference to FIG. 2 and equations (1) through (6), this numerical example assumes that (all times are represented in microseconds): 1 kHz sampling for the transmitted samples, the clock offset time $t_{OFFSET}$ is 450027 (where relay 1 is ahead of relay 2 by about half a second); the channel delay time $t_{CH}$ is 3011 (about 3 ms one way); and the predetermined time constant $t_{TX}$ is 250.

To start the example, assume that relay 1 is ready to send its data at 605000 (605 ms after the top of a second). Relay 1 sends the packet 216 after the predetermined time constant $t_{TX}$ following the newest sample 214 in the packet 216. Thus, the packet is transmitted at:

$$t_0 = 605000 + 250 = 605250.$$

The packet 216 arrives after channel delay that is at 605250+3011 relay 1 time. At this moment, relay 2 clock shows 605250+3011−450027=158243. So:

$$t_1 = 158234.$$

Sending its data every 3 ms (groups of three samples), relay 2 is ready to respond to the message at 160000. Again, the message is transmitted after being intentionally delayed by the predetermined time constant $t_{TX}$ of 250. So:

$$t_2 = 160000 + 250 = 160250.$$

And, the hold time $t_H$ included in the message from relay 2 to relay 1 is:

$$t_H = 160250 − 158234 = 2016.$$

Also, the message from relay 2 includes the time stamp $t_{DATA}$ of the newest current sample 222 in the packet 217:

$$t_{DATA} = 160000.$$

The message from relay 2 is received by relay 1 after the channel delay $t_{CH}$, so relay 1 time stamps it at 160250+3011=163261 relay 2 time. At that point, relay 1 clock shows 163261+450027=613288. Thus:

$$t_3 = 613288.$$

Now, relay 1 applies equation (5) to calculate the clock offset:

$$t_{OFFSET} = \tfrac{1}{2} \cdot (605250 + 613288 + 2016) − 250 − 160000 = 450027.$$

The $t_{OFFSET}$ value is as expected, showing that relay 1 leads relay 2 by 450027 microseconds. This calculation is repeated each time the sequence number is returned, and yields the same result as long as the channel is symmetrical and the clocks do not drift. Clock drifts are followed by this calculation.

The data time stamp received from relay 2 is shifted by this offset before the data from relay 2 can be used with data at relay 1. After the shift, the time stamp of 160000 is 160000+450027=610027 expressed in relay 1 time.

In this example, relay 2 runs similar calculations and arrives at the same number with a reversed sign (−450027), showing that relay 2 lags relay 1 by about 0.5 seconds.

External Time Reference Based Synchronization

Figure 3:
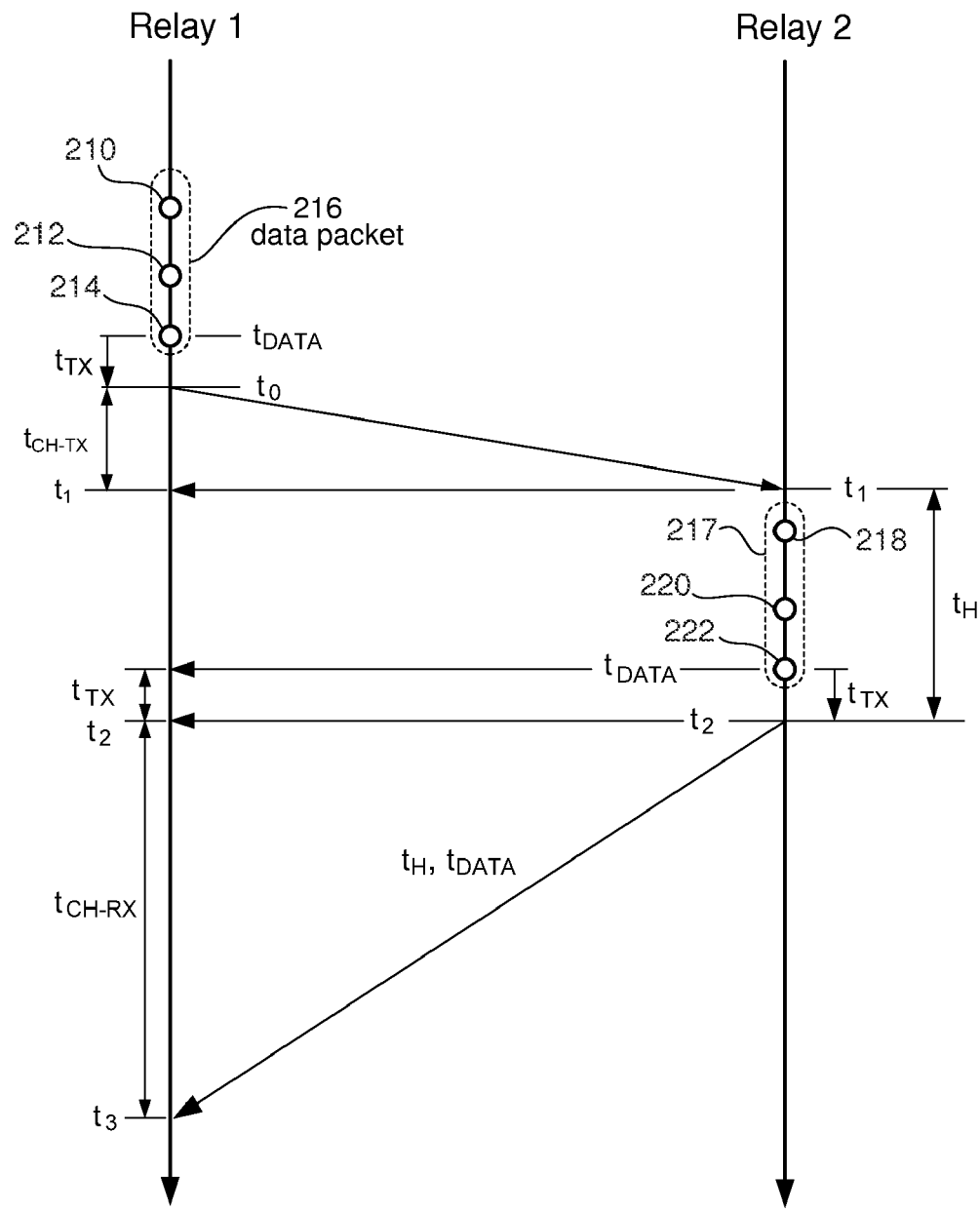
FIG. 3 illustrates an example timing chart of communication between a first relay and a second relay using external time reference based synchronization according to one embodiment.

FIG. 3 illustrates an example timing chart of communication between relay 1 and relay 2 using external time reference based synchronization according to one embodiment. Thus, in this embodiment both relays are synchronized to the same external time source such that their local times are mutually synchronized. The relays take samples at the same points in time (e.g., relative to the top of a second) and assign the same time stamps to the simultaneously taken data. The data is therefore aligned directly based on the time stamps, applying the same equations as in the channel based synchronization mode except that the clock offset not calculated, but known as:

$$t_{OFFSET} = 0 \quad (7)$$

The rest of the alignment works the same way as in the channel based synchronization mode. In particular, the message transmit and receive times are captured and the hold time is communicated. These values have different usage, however. In the external time reference synchronization mode, these values allow the relays to characterize the communication channel as follows.

The channel delay in the receive direction at relay 1 is calculated as:

$$t_{CH-RX} = t_3 − t_2 = t_3 − (t_{DATA} + t_{TX}) \quad (8)$$

The channel delay in the transmit direction at relay 1 is calculated as:

$$t_{CH-TX} = t_3 − t_0 − t_H − t_{CH-RX} \quad (9)$$

The two channel times may be made available to the user for alarming and overall channel monitoring. Also, these channel measurements may be used to control response of the differential system to the loss of the external time reference, as discussed below.

Numerical Example for External Time Reference Synchronization

The following numerical values for external time reference synchronization are provided by way of example only, and not by limitation. With reference to FIG. 3 and equations (1) through (9), this numerical example assumes that (all times are represented in microseconds): 1 kHz sampling is used for communicated current samples, the clock offset time $t_{OFFSET}$ is 0, the channel delay from relay 1 to relay 2 is 2523 (about 2.5 ms), the channel delay from relay 2 to relay 1 is 4197 (about 4.2 ms), and the predetermined time constant $t_{TX}$ is 250.

To start this example, assume that relay is ready to send its data at 605000 (605 ms after the top of a second). Relay 1 sends the packet 216 after the predetermined time constant $t_{TX}$ following the newest sample 214 in the packet 216. Thus, the packet is transmitted at:

$$t_0 = 605000 + 250 = 605250.$$

The packet 216 arrives after channel delay that is at 605250+2523 relay 1 time or relay 2 time (because the clocks are synchronized to the same time reference). So:

$$t_1=607773.$$

Sending its data every 3 ms (groups of 3 samples), relay 2 is ready to respond to the message at 610000. Again, the message is transmitted after being intentionally delayed by the predetermined time constant $t_{TX}$ of 250. So:

$$t_2=610000+250=610250.$$

And, the hold time $t_H$ included in the message from relay 2 to relay 1 is:

$$t_H=610250-607773=2477.$$

Also, the message from relay 2 includes the time stamp $t_{DATA}$ of the newest current sample 222 in the packet 217:

$$t_{DATA}=610000.$$

The message from relay 2 is received by relay 1 after the corresponding channel delay, so relay 1 time stamps it at 610250+4197. Thus:

$$t_3=614447.$$

Now, relay 1 applies equation (8) to calculate the channel delay in the receive direction:

$$t_{CH-RX}=614447-(610000+250)=4197.$$

This represents a true channel delay for transmission from relay 2 to relay 1 in this example. Next, relay 1 applies equation (9) to calculate channel delay in the transmit direction:

$$t_{CH-TX}=610000+250-2477-605250=2523.$$

Again, this represents a true channel delay for transmission from relay 1 to relay 2 in this example.

In this example, relay 2 runs similar calculations and arrives at the same numbers with the TX and RX directions reversed.

In this example, channel asymmetry is 4197−2523=1647 microseconds. This information is available to both relays and both relays may make decisions based on this information as to what to do should the common time reference be lost.

There is an error produced if channel based synchronization is used for this asymmetrical channel after losing the external time reference. Using equation (5), relay 1 estimates the clock offset of:

$$t_{OFFSET}=\tfrac{1}{2}\cdot(605250+614447+2477)-250-610000=837.$$

This spurious offset of 837 microseconds is half the channel asymmetry. When applied, the spurious offset shifts the local and remote currents by 837*360/16667=18.1 electrical degrees, yielding a spurious differential signal of 31.5% of the through current.

Thus, just before the external time reference is lost according to certain embodiments, the relay measures channel asymmetry and predicts the spurious differential current that would result should the external time reference be lost and the channel based method applied. As discussed below, the relays increase security accordingly and keep running using channel based mode as long as the total channel delay does not change, which indicates possible channel switching.

Example Sources of External Time Reference

The common time reference may be provided via an IRIG-B connection from a GPS-synchronized substation clock. This may, however, create some concerns for protection applications in terms of relying on extra equipment and exposing the differential system to the failure modes thereof. The failure points may include, for example, the connection between the relay and the clock including copper to fiber conversion, if any, the clock itself, its cabling and antenna, and the broadcast of the GPS signal itself.

Thus, other embodiments utilize as little equipment and connections as possible in order to maximize availability and remove unnecessary failure modes. For example, certain embodiments may use terrestrial wide area systems that provide for precise timing independently from the GPS time. One embodiment uses the internal precise timing of a SONET system to serve common time at individual multiplexer nodes. Normally, this common time is synchronized to GPS via an array of receivers placed at different geographical locations, but if connections to all GPS receivers are lost or the GPS system itself becomes unavailable, the common wide area time continues to be generated internally by the SONET system. This enhances availability of line current differential systems operating in the external time reference synchronization mode. Artisans will recognize from the disclosure herein that other sources of reliable external time reference (e.g., radio broadcast time sources such as those transmitted by WWV, WWVB, and WWVH, local network time sources, etc.) may also be used.

Even with a reliable external time reference, however, embodiments disclosed herein consider a failure mode of losing the time reference due to problems with connections for the timing signal (e.g., IRIG-B or IEEE1588 (Standard for a Precision Clock Synchronization Protocol for Networked Measurement and Control Systems) via Ethernet).

Fallback Strategies for Loss of the External Time Reference

In the external time reference mode, a line current differential system would lose synchronization if an external time reference were lost for an asymmetrical channel. Thus, as discussed above, certain embodiments provide fallback strategies that allow the line current differential system to continue providing protection upon the loss of the external time reference.

Figure 4:
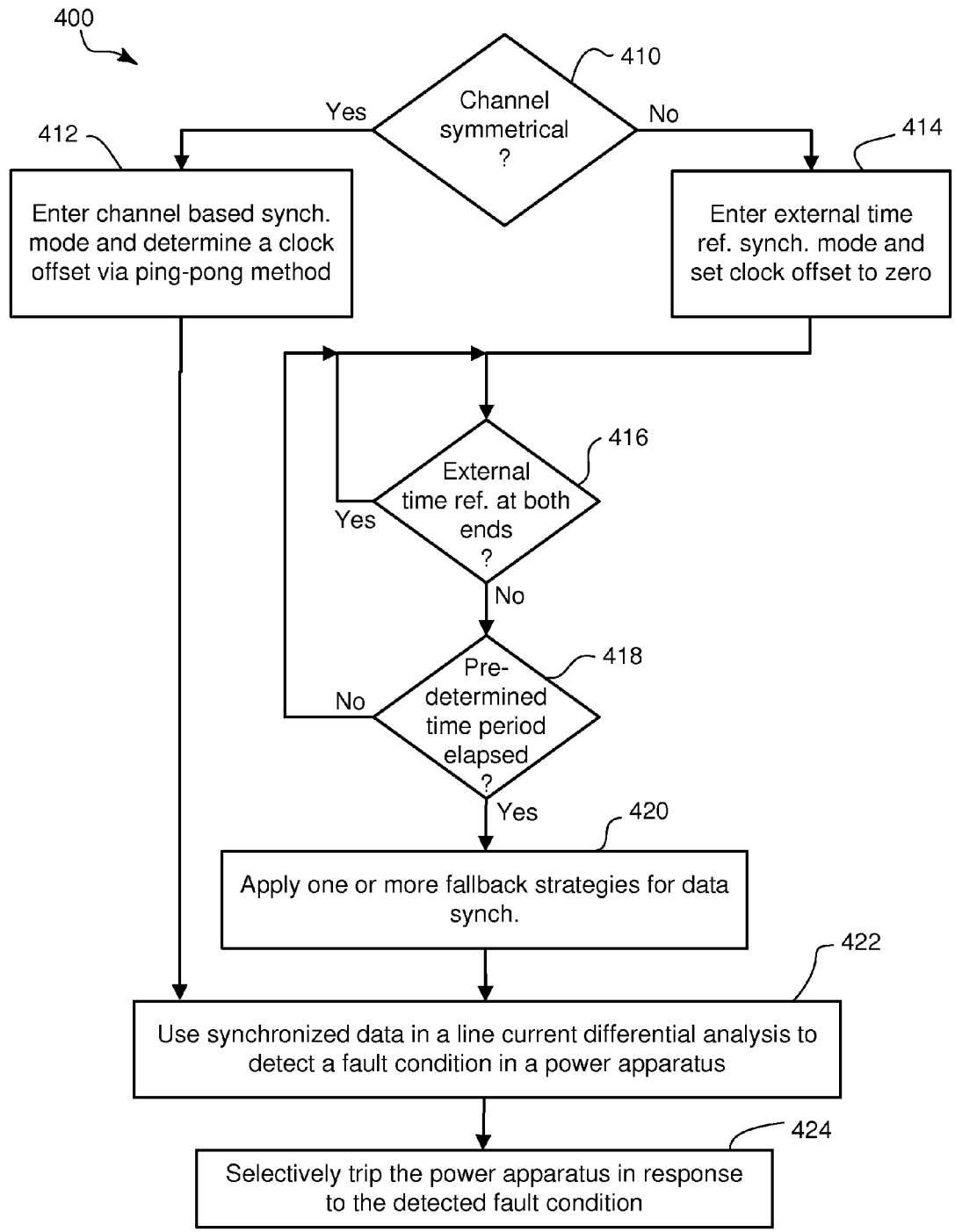
FIG. 4 is a flowchart of a method for providing line current differential protection upon the loss of an external time reference according to one embodiment.

FIG. 4 is a flowchart of a method 400 for providing line current differential protection upon the loss of an external time reference according to one embodiment. For each communication channel in a line current differential system, the method 400 includes determining 410 (e.g., as a part of installation based on the communication system characteristics) whether the channel is a symmetrical channel. This determination is based on the type of communication channel being used, rather than on a current state of the channel behavior. For example, a channel that is currently behaving symmetrically may later behave asymmetrically (e.g., if the channel is switched). Whereas certain types of communication channels (e.g., direct fiber communication channels) may be guaranteed to be symmetrical. Accordingly, the determination 410 of whether or not the channel is a symmetrical channel may be provided by user selection.

If the channel is determined to be a symmetrical channel, the method 400 includes entering a 412 channel based synchronization mode for the channel and determining a clock offset via a ping-pong method, as discussed above. This makes synchronization of data exchanged via this channel independent from any external time sources. If, however, the channel is determined to be an asymmetrical channel, the method 400 includes entering 414 an external time reference synchronization mode for the channel, relying on the external time source available at both ends of the channel and setting the clock offset to zero.

The method 400 further includes monitoring 416 the continued availability of the external time reference used in the external time reference synchronization mode. If the external time reference is lost at either or both ends of the channel, the method 400 determines 418 whether the external time reference is recovered after a predetermined period of time. As discussed above, the system may continue to use the channel in the external time reference synchronization mode (that is, the system continues to assume the clock offset is zero) for a short period of time (e.g., until clock drift causes increased spurious differential current). If the external time reference is recovered within the predetermined period of time, the system continues to use the channel in the external time reference synchronization mode and continues monitoring 416 the availability of the external time reference. If, however, the external time reference is not recovered within the predetermined time, the method 400 applies 420 one or more fallback strategies. The fallback strategy may include, for example, disabling or de-sensitizing (e.g., to a user selected degree) the line current differential protection function. As discussed in detail below, other fallback strategies include switching from the external time reference synchronization mode to the channel based synchronization mode, or marking the channel as unavailable and using other available channels in a master-slave mode to provide communication for the line current differential protection.

After the data exchanged between relays through the channel is synchronized, the method 400 includes using 422 the synchronized data in a line current differential analysis to detect a fault condition in a power apparatus. The method 400 also includes selectively tripping 424 the power apparatus in response to the detected fault condition.

Figure 5:
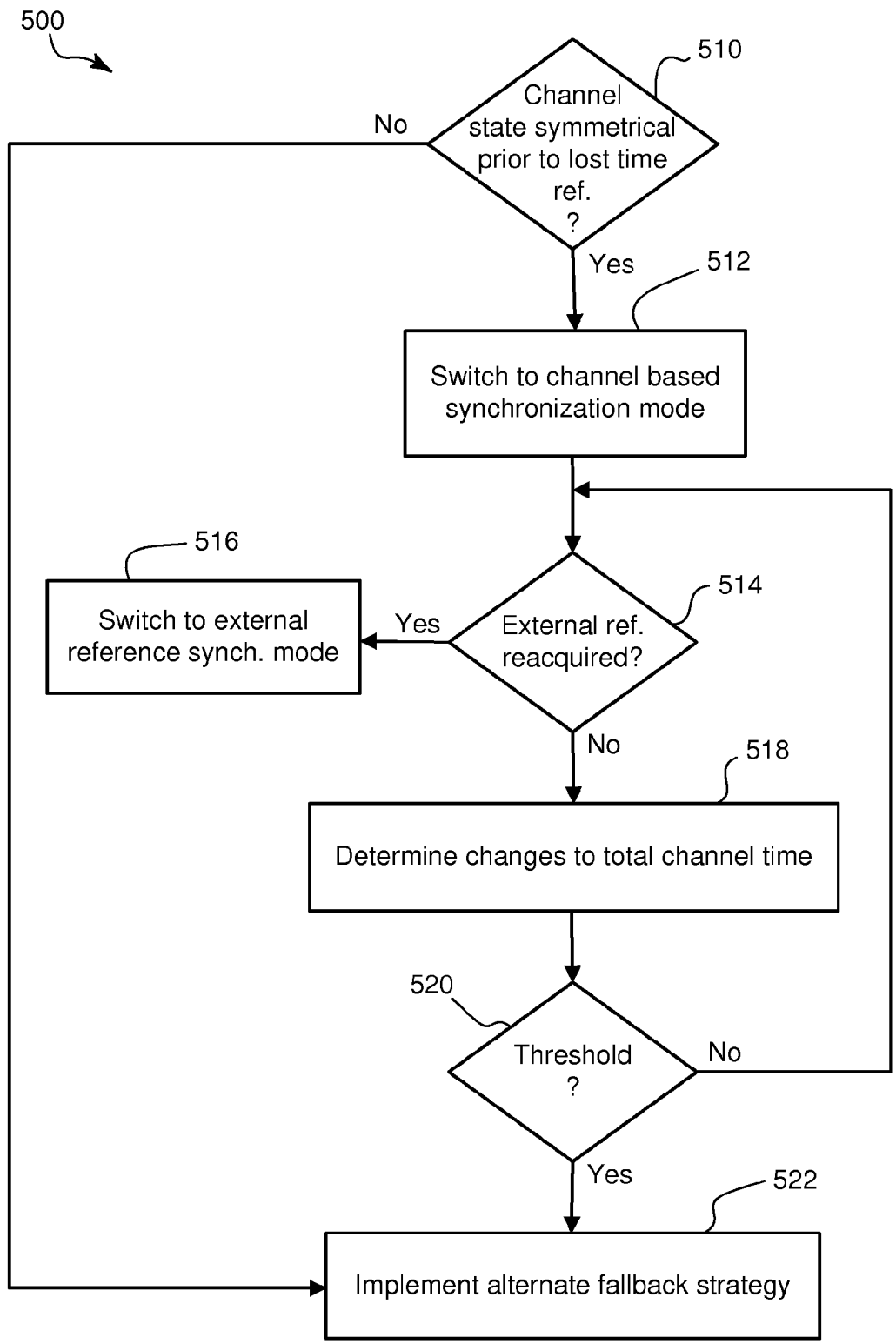
FIG. 5 is a flowchart of a fallback strategy method that uses channel based synchronization when an external time reference is lost according to one embodiment.

FIG. 5 is a flowchart of a fallback strategy method 500 that uses channel based synchronization when an external time reference is lost according to one embodiment. The method 500 includes determining 510 whether the channel state is symmetrical just prior to losing the time reference. Although the channel may not be guaranteed to always be symmetrical, the channel state may be symmetrical just prior to losing the external time reference. If so, the method 500 includes switching 512 the channel from the external time reference synchronization mode to the channel based synchronization mode. As long as the channel stays symmetrical, the channel based synchronization mode ensures proper data synchronization.

In the channel based synchronization mode, the method 500 monitors 514 for a possible reacquisition of the external time reference. If the external time reference is reacquired, the method 500 switches 516 back to the external time reference synchronization mode. If the external time reference is not reacquired, the method 500 includes determining 518 changes to a total channel time. The total channel time is the roundtrip time for sending a message through the channel and receiving a response to the message through the channel (e.g., determined using the ping-pong method discussed above). Determination of the total round trip channel time is accurate for symmetrical and asymmetrical channels, and does not require the external time reference to be present. The method 500 then determines 520 whether a change in the total channel time exceeds a threshold. For example, a sufficient change to the total channel time may indicate that the channel has been switched and may become asymmetrical as a result of the switching. If the threshold is not exceeded, then the method 500 continues using the channel in the channel based synchronization mode. If the threshold is exceeded, however, the method implements 522 an alternate fallback strategy. Again, the alternate fallback strategy may include disabling or de-sensitizing the line current differential protection function, or using one of the other fallback strategies disclosed herein.

Figure 6:
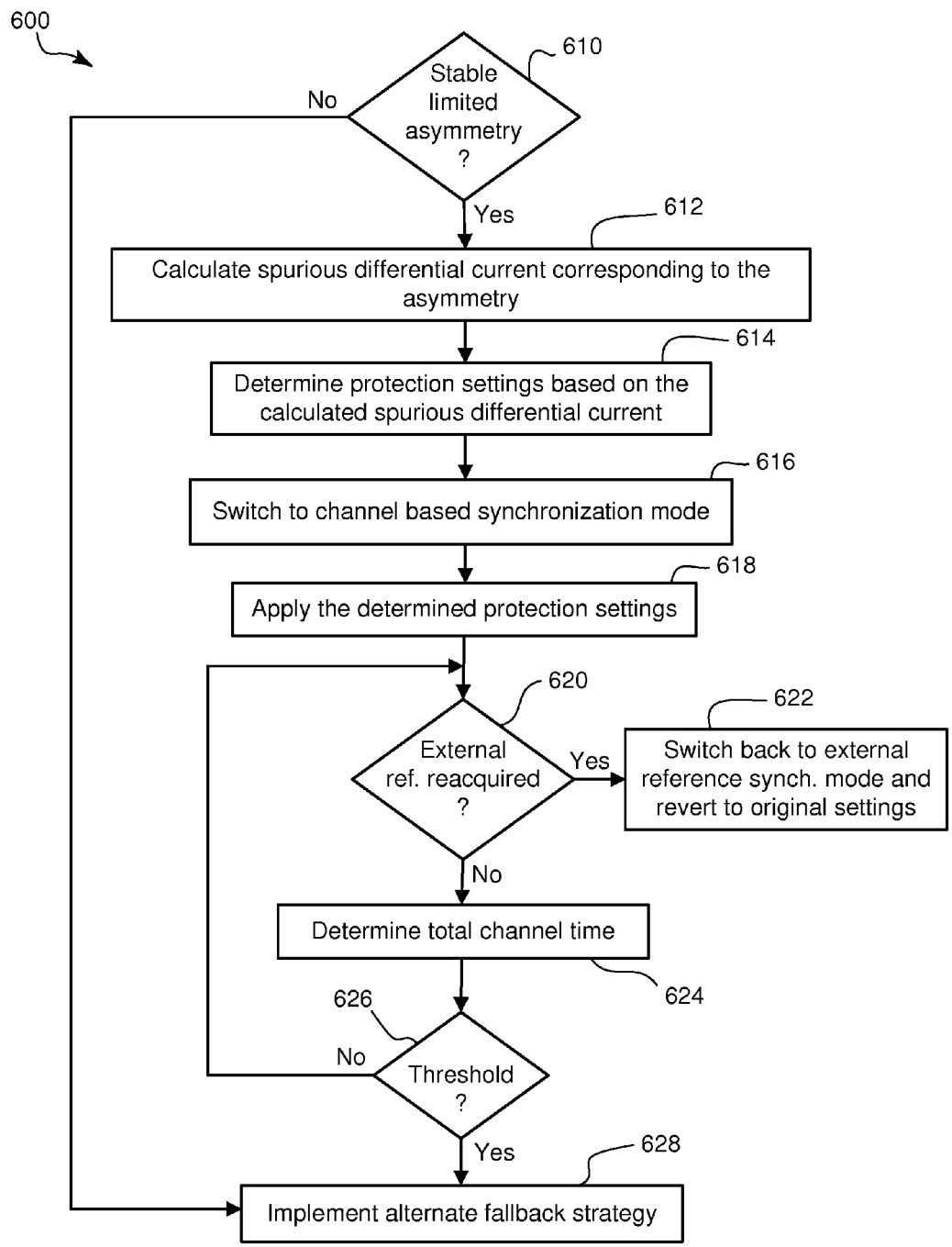
FIG. 6 is a flowchart of a fallback strategy method that selects protection settings in the channel based synchronization mode to counter a spurious differential current when an external time reference is lost according to one embodiment.

FIG. 6 is a flowchart of a fallback strategy method 600 that selects protection settings in the channel based synchronization mode to counter a spurious differential current when an external time reference is lost according to one embodiment. The method 600 includes determining 610 whether a communication channel displays a stable limited asymmetry prior to losing the external time reference. In one embodiment, for example, a stable limited asymmetry may be considered an asymmetry that does not exceed half a power cycle. An asymmetry that exceeds half a power cycle may be so high that protection settings used to counter the asymmetry discussed below effectively shut down the differential function. If the channel does display a stable limited asymmetry, the method 600 includes calculating 612 calculating a spurious differential current corresponding to the asymmetry, such as the spurious offset calculated in the example above.

The method 600 also includes determining 614 protection settings based on the calculated spurious differential current. This may include, for example, setting a stability angle value in an alpha plane analysis based on the calculated spurious differential current. For example, a 90 degree stability angle setting in the alpha plane may be used for an 8 ms asymmetry. In another embodiment, determining the protection settings may include determining a slope setting of the characteristic in a percentage restraint characteristic analysis. Upon losing the external time reference, the method 600 includes switching 616 the channel from the external time reference synchronization mode to the channel based synchronization mode, and applying 618 the determined protection settings.

As discussed above with respect to FIG. 5, the method 600 in FIG. 6 also includes monitoring 620 for a possible reacquisition of the external time reference. If the external time reference is reacquired, the method 600 switches 622 back to the external time reference synchronization mode and reverts to the original, more sensitive, settings of the differential function. If the external time reference is not reacquired, the method 600 includes determining 624 changes to the total channel time and determining 626 whether the change in the total channel time exceeds a threshold. If the threshold is not exceeded, then the method 600 continues using the channel in the channel based synchronization mode. If the threshold is exceeded, however, the method 600 implements 628 an alternate fallback strategy. Again, the alternate fallback strategy may include disabling or de-sensitizing the line current differential protection function, or using one of the other fallback strategies disclosed herein.

Figure 7:
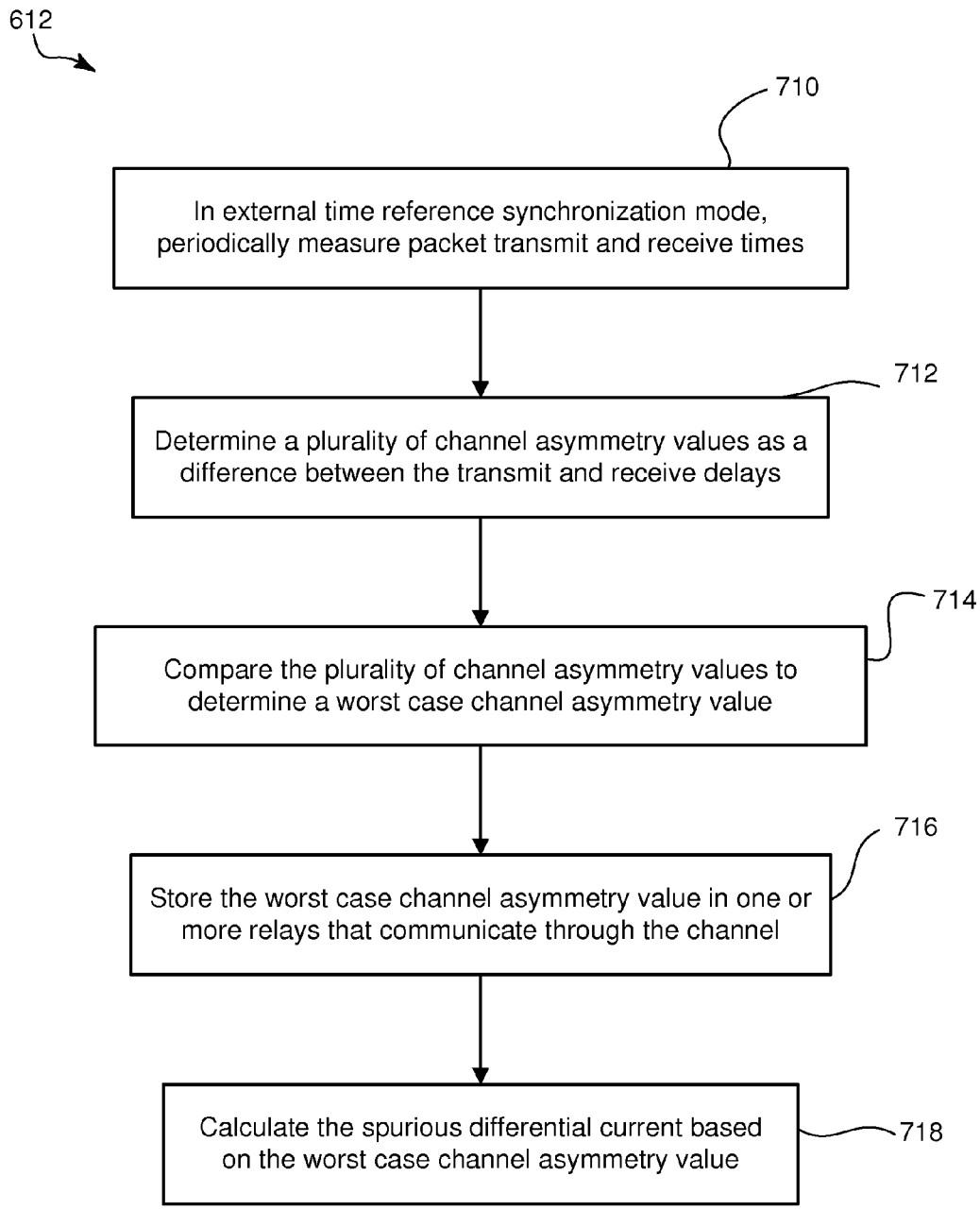
FIG. 7 is a flow chart of a method for calculating a spurious differential value, as shown in FIG. 6, based on a worst case channel asymmetry according to one embodiment.

FIG. 7 is a flow chart of a method 612 for calculating a spurious differential value, as shown in FIG. 6, based on a worst case channel asymmetry according to one embodiment. In the external time reference synchronization mode (e.g., before the external time reference is lost), the method 612 according to FIG. 7 includes periodically measuring 710 packet transmit and receive times. The method 612 further includes determining 712 a plurality of channel asymmetry values as a difference between the transmit and receive delays. The method 612 then includes comparing 714 the plurality of channel asymmetry values to determine a worst case channel asymmetry value, and storing 716 the worst case channel asymmetry value in one or more of the relays that communicate through the channel. Initially, a user setting may be stored as the worst case asymmetry value. With passing of time (e.g., weeks, months, and years), the determined worst case asymmetry value is established for a given channel. The method 612 also includes calculating 718 the spurious differential current based on the worst case channel asymmetry. As discussed above with respect to FIG. 6, the spurious differential current may then be used to determine protection settings used if the channel is switched to the channel based synchronization mode upon loss of the external time reference.

As discussed above, a line current differential protection system may include both symmetrical channels operating in the channel based synchronization mode and asymmetrical channels operating in the external time reference synchronization mode.

Figure 8:
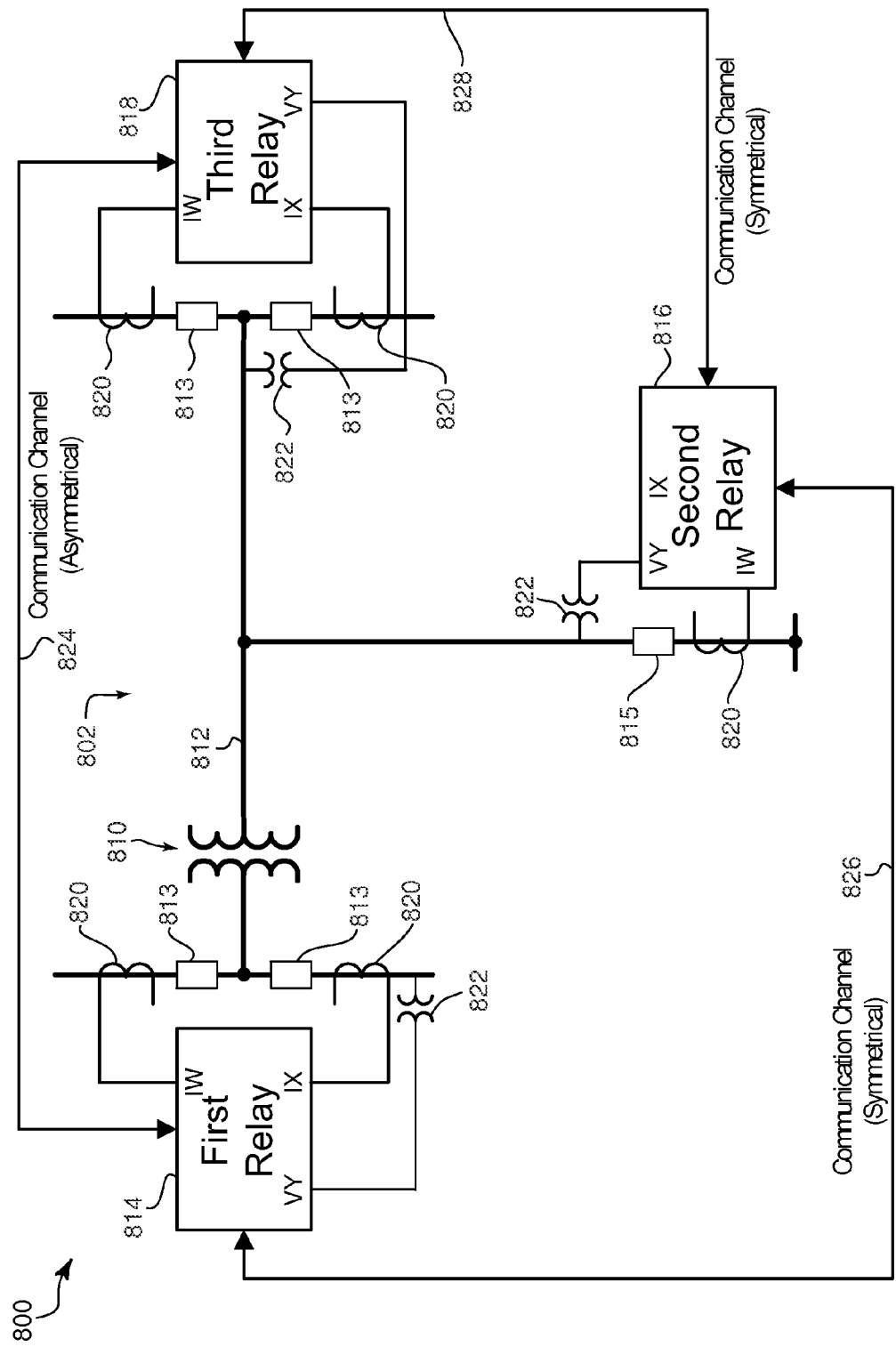
FIG. 8 is a block diagram of a line current differential protection system for use with a three-terminal power apparatus according to one embodiment.

For example, FIG. 8 is a block diagram of a line current differential protection system 800 for use with a three-terminal power apparatus 802 according to one embodiment. By way of illustration, and not by limitation, the power apparatus 802 includes a transformer 810 and a tapped transmission line 812. In this example embodiment, two line ends are each terminated in a dual-breaker connection (e.g., using breakers 813) and a third line end is terminated in a single-breaker connection (e.g., using breaker 815). Each terminal shown in FIG. 8 may be located, for example, in a different substation of a power distribution system.

The line current differential protection system 800 includes a first relay 814, a second relay 816, and a third relay 818. Each relay is configured to receive current measurements (through inputs IW and/or IX) from respective CTs 820 and voltage measurements through respective voltage transformers (VTs) 822.

In this example embodiment, the first relay 814 and the third relay 818 communicate with each other through an asymmetrical communication channel 824 configured to operate in the external time reference synchronization mode. The first relay 814 and the second relay 816 communicate through a symmetrical channel 826 configured to operate in the channel based synchronization mode. The second relay 816 and the third relay 818 communicate through a symmetrical channel 828 configured to operate in the channel based synchronization mode.

If the external time reference is lost at the first relay 814 or the third relay 818, the system 800 according to one embodiment marks the asynchronous channel 824 as unavailable. For example, the system 800 may determine that continued use of the asymmetrical channel 824 in either the external time differential synchronization mode or the channel based synchronization mode would result in insufficient line current differential protection (e.g., the resulting spurious differential current may exceed a threshold level). Once marked as unavailable, the system 800 stops communicating current sample data through the asynchronous channel 824 or flags the data to indicate that the relay sending the data is not locked to the external time reference (e.g., the data may still be communicated through the asynchronous channel 824 but may not be used in this mode). The system 800 may resume use of the asymmetrical channel 824 if the external time reference is reacquired.

Because the symmetrical channels 826, 828 do not rely on the external time reference, the symmetrical channels 826, 828 continue to operate in the channel based synchronization mode after the external time reference is lost. Thus, upon discontinuing use of the asymmetrical channel 824, the system 800 continues to provide line current differential protection by entering a master-slave mode wherein the second relay 816 effectively becomes a master and the first and third relays 814, 818 become slaves. Thus, in the master-slave mode, the first and third relays 814, 818 inhibit their differential function and rely on the differential function of the second relay. The second relay 816 makes trip decisions based on data received from the first relay 814 through the symmetrical channel 826 and data received from the third relay 818 through the symmetrical channel 828. To trip the power apparatus 802, the second relay 816 sends a DTT signal, as discussed above, to the first and third relays 814, 818.

It will be understood by those having skill in the art that many changes may be made to the details of the above-described embodiments without departing from the underlying principles of the invention. The scope of the present invention should, therefore, be determined only by the following claims.

The invention claimed is:

1. A system to provide line current differential protection to a power apparatus that includes three or more terminals upon the loss of an external time reference, the system comprising:
   three or more relays to determine current values at respective terminals of a power apparatus,
   each relay configured to communicate its current values through respective communication channels to at least one of the other relays,
   the three or more relays configured, based on characteristics of the respective communication channels, to operate at least a first communication channel in a channel based synchronization mode and at least a second communication channel in an external time reference synchronization mode:
   wherein upon the loss of an external time reference, a first relay and a second relay configured to communicate with each other through the second communication channel apply a fallback strategy to provide line current differential protection to the power apparatus in the absence or inaccuracy of the external time reference.

2. The system of claim 1, wherein at least one of the first relay and the second relay is further configured to:
   estimate, in the external time reference synchronization mode, an asymmetry value of the second communication channel; and
   based on the estimated asymmetry value, determine one or more protection settings for use in the channel based synchronization mode to provide line current differential protection.

3. The system of claim 2, wherein at least one of the first relay and the second relay estimates the asymmetry value just prior to the loss of the external time reference.

4. The system of claim 2, wherein the estimated asymmetry value comprises a worst case asymmetry value of the second communication channel over a period of time.

5. The system of claim 2, wherein the fallback strategy comprises switching the second communication channel from the external time reference synchronization mode to the channel based synchronization mode and applying the determined protection settings in the line current differential analysis.

6. The system of claim 5, wherein at least one of the first relay and the second relay is further configured to:
   in the channel based synchronization mode, determine a change in a roundtrip channel time; and
   in response to the change, implementing an alternate fallback strategy.

7. The system of claim 1, wherein the fallback strategy comprises entering a master-slave mode wherein the second communication channel is marked as unavailable for providing the synchronized data used for line current differential protection, wherein in the master-clave mode:
   the first relay is configured in a slave mode;
   the second relay is configured in a slave mode; and a third relay is configured in a master mode, wherein the third relay is configured to receive current values from the first relay through the first communication channel and from the second relay through a third communication channel, and wherein the third relay is configured to send a signal to the first and second relays to indicate when to trip the power apparatus.

8. A method for providing line current differential protection using mixed synchronization modes upon the loss of an external time reference, the method comprising:

selectively operating a plurality of communication channels in a line current differential protection system in one of a channel based synchronization mode and an external time reference synchronization mode, wherein the selection is based on characteristics of the respective communication channels, and wherein at least a first communication channel operates in the channel based synchronization mode and at least a second communication channel operates in the external time reference synchronization mode;

detecting a loss of an external time reference;

in response to the loss of the external time reference, applying at least one fallback strategy for data synchronization to the second communication channel; and using synchronized data communicated through at least one of the first communication channel and the second communication channel in a line current differential analysis to selectively trip a power apparatus.

9. The method of claim 8, wherein the at least one fallback strategy comprises:

determining that the second communication channel is in a symmetrical state just prior to the detected loss of the external time reference;

switching the second communication channel from the external time reference synchronization mode to the channel based synchronization mode;

in the channel based synchronization mode, determining a change in a soundtrip channel time; and in response to the change, implementing an alternate fallback strategy.

10. The method of claim 8, wherein the at least one fallback strategy comprises:

determining an asymmetry value of the second communication channel;

calculating a spurious differential current value corresponding to the asymmetry value;

determining one or more protection settings based on the calculated spurious differential current value;

switching the second communication channel from the external time reference synchronization mode to the channel based synchronization mode; and applying the determined protection settings in the line current differential analysis.

11. The method of claim 10, further comprising:

in the channel based synchronization mode, determining a change in a roundtrip channel time; and in response to the change, implementing an alternate fallback strategy.

12. The method of claim 10, wherein calculating the spurious differential current value comprises:

in the external time reference synchronization mode, periodically measuring packet transmit and receive time through the second communication channel;

calculating a plurality of channel asymmetry values corresponding to respective differences between the packet transmit and receive times;

comparing the plurality of channel asymmetry values to determine a worst case channel asymmetry value; and calculating the spurious differential current value based on the worst case channel asymmetry value.

13. The method of claim 8, wherein the at least one fallback strategy:

marking the second communication channel as unavailable for providing the synchronized data used in the line current differential analysis; and entering a master-slave mode wherein a first relay and a second relay inhibit their differential function and become slaves to a third relay that communicates with at least one of the first and second relays through the first communication channel, wherein the third relay sends a signal to the first and second relays indicating when to trip the power apparatus.

14. The method of claim 13, wherein the third relay is configured to communicate directly with the first relay through the first communication channel, and wherein the third relay is configured to communicate directly with the second relay directly through a third communication channel.

15. A method for providing line current differential protection upon the loss of an external time reference, the method comprising:

operating a communication channel in a line current differential protection system in an external time reference synchronization mode;

estimating, in the external time reference synchronization mode, an asymmetry value of the communication channel;

based on the estimated asymmetry value, determining one or more protection settings;

detecting a loss of an external time reference;

in response to the loss of the external time reference, switching the communication channel from the external time reference synchronization mode to a channel based synchronization mode;

applying the protection settings in the channel based synchronization mode; and using synchronized data communicated through the communication channel in a line current differential analysis to selectively trip a power apparatus.

16. The method of claim 15, further comprising:

determining that the communication channel is in a symmetrical state just prior to the detected loss of the external time reference;

in the channel based synchronization mode, determining a change in a roundtrip channel time; and in response to the change, implementing a fallback strategy for data synchronization through the channel.

17. The method of claim 15, wherein determining the one or more protection settings comprises:

calculating a spurious differential current value corresponding to the asymmetry value; and determining the one or more protection settings based on the calculated spurious differential current value.

18. The method of claim 17, wherein calculating the spurious differential current value comprises:

in the external time reference synchronization mode, periodically measuring packet transmit and receive times through the communication channel;

calculating a plurality of channel asymmetry values corresponding to respective differences between the packet transmit and receive times;

comparing the plurality of channel asymmetry values to determine a worse case channel asymmetry value; and calculating the spurious differential current based on the worst case channel asymmetry value.

19. The method of claim 15, further comprising:
marking the communication channel as unavailable for providing the synchronized data used in the line current differential analysis; and
entering a master-slave mode wherein a first relay and a second relay inhibit their differential function and become slaves to a third relay that communicates with the first and second relays through other communication channels, wherein the third relay sends a signal to the first and second relays indicating when to trip the power apparatus.

20. A method for providing line current differential protection upon the loss of an external time reference, the method comprising:
communicating data between a first relay and a second relay through a communication channel in a line current differential protection system;
detecting a loss of an external time reference used to synchronize the data communicated between the first relay and the second relay through the communication channel;
in response to the loss of the external time reference, entering a master-slave mode wherein the first relay and the second relay inhibit their differential function and become slaves to a third relay that communicates with the first and second relays through other communication channels;
using a line current differential analysis in the third relay, wherein the third relay sends a signal to the first and second relays indicating when to trip a power apparatus based on the line current differential analysis; and
tripping the power apparatus in response to the signal sent from the third relay.

* * * * *